United States Patent [19]
Grienauer

[11] 3,792,269
[45] Feb. 12, 1974

[54] SLIT SCREEN FOR X-RAY APPARATUS USED IN DETERMINING CRYSTAL TOPOGRAPHY

[75] Inventor: Heinrich Grienauer, Munich, Germany

[73] Assignee: Siemens Aktiengesellschaft, Berlin and Munich, Germany

[22] Filed: Nov. 25, 1970

[21] Appl. No.: 92,591

[30] Foreign Application Priority Data
Nov. 26, 1969  Germany.............................. 1959226

[52] U.S. Cl.................. 250/272, 250/273, 250/275
[51] Int. Cl. ......................................... G01n 23/20
[58] Field of Search......................... 250/51.5, 65 R

[56] References Cited
UNITED STATES PATENTS
2,497,543    2/1950   Frevel............................ 250/51.5 X OTHER PUBLICATIONS
Lang; "Acta Metallurgica;" Vol. 5; July; 1957; pp. 358–364.

Primary Examiner—William F. Lindquist
Attorney, Agent, or Firm—Edwin E. Greigg

[57] ABSTRACT

In an X-ray apparatus for examining crystal planes with the method of X-ray topography, in the path of the primary X-ray beam there is disposed a slit screen, the slit of which has a curved shape.

3 Claims, 2 Drawing Figures

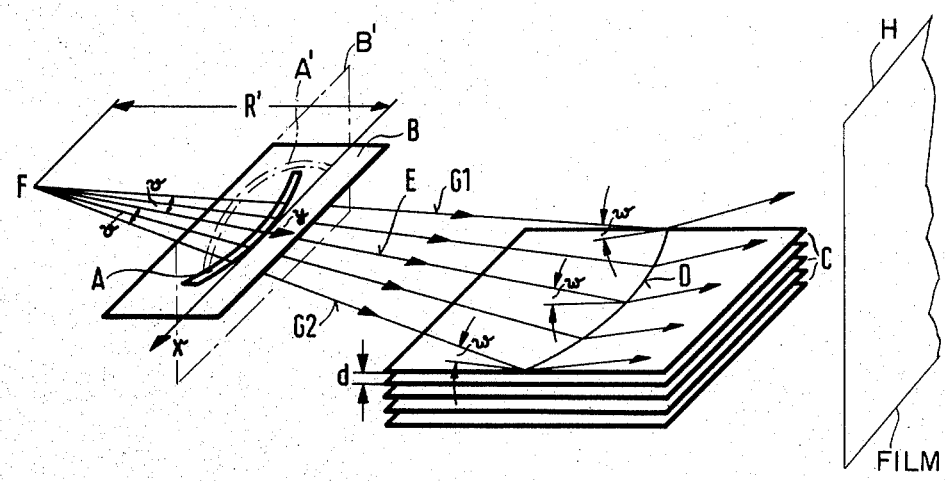

SLIT SCREEN FOR X-RAY APPARATUS USED IN DETERMINING CRYSTAL TOPOGRAPHY

BACKGROUND OF THE INVENTION

This invention relates to a slit screen, particularly for use in an X-ray apparatus for determining crystal topography and is of the type usually situated between a point focus of the X-ray tube and a face of the crystal sample.

By means of X-ray topography structural defects may be made visible in monocrystal samples without their destruction. The process is based on the diffraction of monochromatic X-ray radiation by the monocrystal according to Bragg's law of diffraction.

It is a requirement that the crystal be adjustable to an accuracy within seconds of one degree in a defined beam which is divergent only to such a small extent that Bragg's condition for diffraction is fulfilled only for the line of the greatest intensity of all spectrum lines that occur in the characteristic X-ray spectrum of the X-ray tube used. In such a case, from the parallel crystal planes interferences of diffraction at Bragg angles are obtained which may be recorded on a film. If, while maintaining the beam stationary, the adjusted crystal sample and the film are moved synchronously to-and-fro in a direction parallel to the sample surface, then for a longer illumination time, the X-rays cover a crystal range whose magnitude depends upon the amplitude of motion. Since at the locations of crystal defects the conditions of diffraction differ from those of the environment, at said locations the intensity is accordingly modified. The distribution of the defective locations is, subsequent to diffraction, recorded on a film disposed behind the sample. In the X-ray topography, the irradiation is so designed that the crystal sample is either in a position in which the incident rays are reflected, or in a position in which the rays pass therethrough.

In X-ray apparatus for the aforenoted purpose either line focus-type or point focus-type X-ray tubes may be used. A line focus has to be divided into a plurality of small point focuses by means of a Soller-screen in order to obtain a sufficiently small divergence of the beam and a capability for a sufficiently good resolution. The use of a Soller-screen, however, results in an intensity loss of approximately 50 percent, since approximately one-half of the line focus is masked by the laminae of the Soller-screen. This disadvantage, of course, does not exist if point focus-type X-ray tubes are used.

The X-ray beam emanating from the point focus of the X-ray tube has to be rendered sharp (i.e., non-divergent) to such an extent by means of a slit screen that only a single line of the spectrum fulfills Bragg's conditions of diffraction.

It is known to use for this purpose screens provided with a straight slit. The use of a straight slit screen gives rise to the substantial disadvantage that only small crystals may be topographically examined. The reason therefor is as follows: The straight slit screen forms a planar, divergent primary beam from the X-rays emanating from the point-like focus of the X-ray tube. Consequently, the primary beam impinges on the crystal in the shape of a straight line. Subsequent to diffraction, the secondary beam strikes a sensitive film for recording. The central ray of the divergent primary beam impinges for instance exactly with the angle of incidence on the diffracting crystal plane that fulfills exactly Bragg's condition of diffraction. The boundary rays of the divergent primary beam, on the other hand, strike the diffracting crystal plane at a somewhat smaller angle. With an increasing angle of opening between the central ray and the boundary rays (i.e., as the divergency angle increases), the angle between the boundary ray and the diffracting crystal plane (angle of incidence) decreases. Thus, the greater the angle of divergence between the boundary rays and the central ray, the lesser do the boundary rays fulfill Bragg's condition.

Since a crystal still reflects rays in a certain incidence angle range which is given by the width of its rocking curve, small deviations of the angle of incidence from the Bragg angle may be neglected. Thus, to ensure a satisfactory topographical examination when a straight slit screen is used, the crystal plane should be exposed to boundary rays that are close to one another. For this purpose the crystal diameter should not be very large. The maximum crystal diameter is, in case of a vertical divergence of approximately $2.5 \times 10^{-2}$ radian (whereby the usual distance between focus and crystal is 1 m), approximately 25 mm. Larger crystals cannot be examined in a single work step. Crystals having large diameters may be still examined in a single step if the distance between focus and crystal is substantially increased. This, however, results in a very substantial loss of radiation intensity.

OBJECT AND SUMMARY OF THE INVENTION

It is an object of the invention to provide an improved X-ray apparatus, having a point focus-type X-ray tube, for a one-step topographic examination of crystals of any desired diameter and at any angle of incidence.

Briefly stated, according to the invention, the slit of the slit screen used has a curved shape.

The requirement that the plane of the slit screen be normal to the central ray of the primary beam results in a further improvement of the invention, according to which the curvature of the slit follows at least part of the contour line of a conic section.

For simplifying the making of a slit screen which, for different modes of application has a sufficiently high resolution, the slit has a configuration of a circular arc.

The invention will be better understood as well as further objects and advantages will become more apparent from the ensuing detailed specification of a preferred, although exemplary, embodiment taken in conjunction with the sole FIGURE which shows the invention is a schematic perspective view.

DESCRIPTION OF THE PREFERRED EMBODIMENT

Turning now to the FIGURE, there is shown the course of the rays between the point-like focus F of an X-ray tube (not shown) and the crystal C in which the distance between layers or planes is $d$. The primary beam travels through the curved slit A of a slit screen B. It is seen that the narrowly positioned slit screen forms a divergent primary beam emitted from the point-like focus F of the X-ray tube. The primary beam, having a divergence angle $2\theta$, impinges in a curved line D on the crystal C. Subsequent to diffraction, the secondary beam impinges upon a sensitive film (not shown) for recording.

The condition to perform a one-step X-ray topography of crystals of any size, is that the slit A has such a configuration that in a certain position of the slit screen B not only the central ray E, but also the two boundary rays G1 and G2 impinge on the crystal with the angle $\omega$ which is identical to the angle of reflection. This is always the case if the shell of an imaginary straight cone extending from the point-like focus F (the apex of the cone) to the crystal plane, intersects the latter under such an angle $\omega$ which fulfills Bragg's equation for the line of greatest intensity of the used anode material. The section line between the crystal plane and the cone shell is a circle. Thus, the slit A has to be of such a configuration that the X-ray beam passing therethrough strikes the crystal C along the circular arc D.

If, as shown in the FIGURE, the plane of the slit screen B is parallel with the diffracting crystal planes, then the required shape of the slit A is a circular arc having a radius $r = R' \cos \omega$, wherein $R'$ is the distance from the focus F to the slit screen B.

A positioning of the slit screen B parallel with the crystal planes is, however, not practical because of the oblique impingement of the X-ray beam. In general, the slit screen B is so oriented that its plane is normal to the central ray E, as shown diagrammatically in phantom lines, the thus positioned slit screen being designated B' and its slit A'. As the calculation below shows, the equation of conic section for a shape of such slit is:

$$y^2(1-\tan^2\omega) - 2R'y\tan\omega - x^2\tan^2\omega = 0$$

wherein $x$ and $y$ are the perpendicular axes of the coordinate system in the plane of the slit screen. The above equation defines a hyperbola if $\tan\omega < 1$, a parabola if $\tan\omega = 1$, and an ellipse if $> 1$.

An osculating circle which approximates these conical sections, has a radius $r'$, for which $$r' = R' / \tan\omega$$

applies. A slit provided according to this approximation makes possible an examination of practically any size of crystals even in modern X-ray topography apparatus which operates with a point-like focus and thus a usually relatively small focus-slit distance.

The slit screen used in any particular examination is dependent upon the angle of reflection $\omega$ characteristic of the crystal and the distance $R'$. The selection of a slit screen thus depends upon the distance of the crystal plane to be examined. For a given curved shape of the slit (for example, a circular arc), different crystals may nevertheless be subsequently examined by the method of X-ray topography if the slit screen B is angularly adjustable about the X-axis.

A film H, which constitutes a means responsive to X-rays diffracted by the crystal sample C, is positioned to intercept the diffracted X-rays.

The advantage achieved by the invention resides particularly in the fact that with the aid of slits of curved shape which, in a good approximation, may be a circular arc, crystals of desired dimensions may be examined by the method of X-ray topography in a single operational step at any angle of incidence.

What is claimed is:

1. In an X-ray apparatus for performing examination of a crystal sample according to the method of X-ray topography, said apparatus is of the type that includes an X-ray tube having a point focus, a planar slit screen disposed in the path of the X-ray beam between said focus and said crystal sample at an angle normal to the central ray of said beam and means responsive to X-rays diffracted by said crystal sample, the improvement in said slit screen comprising a slit having the shape of a conic section determined by the equation $$y^2(1-\tan^2\omega) - 2R'y\tan\omega - x^2\tan^2\omega = 0$$

wherein $x$ and $y$ are mutually perpendicular axes of a coordinate system coplanar with the slit screen, $R'$ is the distance between the focus and the slit screen and $\omega$ is the angle of incidence of the X-rays on the crystal plane to be examined.

2. An improvement as defined in claim 1, wherein said conic section is a circular arc and is determined by the equation $$r' = R' / \tan\omega$$

wherein $r'$ is the radius of said circular arc, $R'$ is the distance between the focus and the slit screen and $\omega$ is the angle of incidence of the X-rays on the crystal plane to be examined.

3. In an X-ray apparatus for performing examination of a crystal sample according to the method of X-ray topography, said apparatus is of the type that includes an X-ray tube having a point focus, a planar slit screen disposed in the path of the X-ray beam between said focus and said crystal sample parallel to the layers of said crystal and means responsive to X-rays diffracted by said crystal sample, the improvement in said slit screen comprising a slit having the shape of a circular arc determining by the equation $$r = R' \cos\omega$$

wherein $r$ is the radius of said circular arc, $R'$ is the distance between the focus and the slit screen and $\omega$ is the angle of incidence of the X-rays on the crystal plane to be examined.

* * * * *